March 31, 1931.  E. O. NELSON  1,798,336
FLUID MIXING DEVICE
Filed July 14, 1927
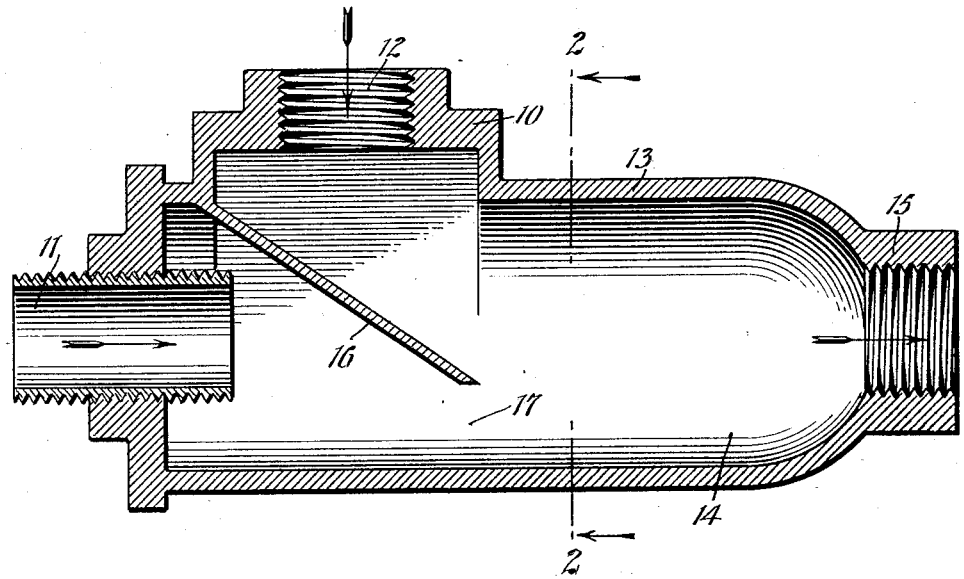
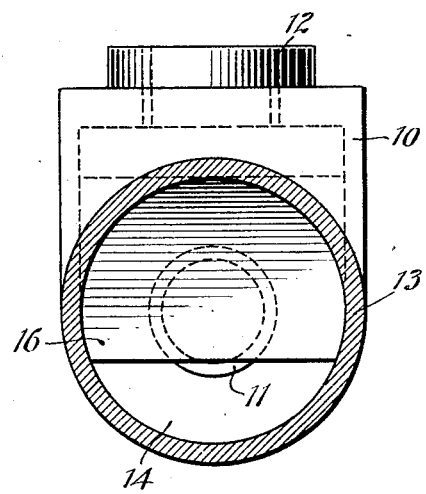
WITNESSES
INVENTOR
E. O. Nelson
BY
ATTORNEY Patented Mar. 31, 1931

1,798,336

UNITED STATES PATENT OFFICE

ELVING OVID NELSON, OF MIDLAND, MICHIGAN, ASSIGNOR OF ONE-THIRD TO LESLIE R. JOHNSON AND ONE-THIRD TO CHARLES N. MORRISON, BOTH OF MIDLAND, MICHIGAN

FLUID-MIXING DEVICE

Application filed July 14, 1927. Serial No. 205,827.

My invention relates to a fluid mixing device and is intended more particularly for embodiment in a water heater in which steam furnishes the heating medium.

The general object of my invention is to provide a mixing device in which the fluids, such as steam and water, will be effectively mixed in the passage through the device before reaching the outlet so that the heating agent gives up its heat to the liquid being heated.

The nature of my invention and its distinguishing features and advantages will clearly appear as the description proceeds.

Reference is to be had to the accompanying drawings forming a part of this specification, it being understood that the drawings are merely illustrative of one example of the invention.

Figure 1 is a longitudinal sectional view of a fluid mixing device embodying my invention.

Figure 2 is a cross section through the mixing chamber and indicated by the line 2—2 in Figure 1.

In carrying out my invention in accordance with the illustrated example, a mixer body 10 is formed with an inlet 11, here shown as in the form of a nipple adapted to connect with the source of steam supply or other heating fluid medium. The numeral 12 indicates an inlet for a liquid to be heated, as for example water.

At one end of the body 10 there is formed integral therewith an elongated extension 13 which, it is to be noted, is round in cross section, as shown clearly in Figure 2. The extension 13 constitutes a mixing chamber as indicated at 14, extending from the body 10. At that end of the extension 13 opposite the body 10 the same is formed into a contracted outlet 15 having internal or external threads to form a suitable connection (not shown) to conduct away the mixed fluids.

Within the body 10 is formed a partition 16 extending from the end of the body 10 adjacent the inlet 11 to the opposite end of the body terminating adjacent the entrance end of the extension 13 and its mixing chamber 14. Said partition 16 extends the full width of the body 10 and is disposed obliquely in said body 10. At said opposite end of the body 10 the oblique partition 16 forms with the adjacent wall of the body 10 an opening or passage 17 for the entrance of the steam or other heating medium into the extension 13 beneath the partition 16. Above the partition 16 free passage is afforded for the water or other liquid entering through the inlet 12 to find entrance to said extension 13.

By providing the elongated chamber 13 beyond the partition 16 and forming the same round in cross section or cylindrical, the liquid in moving through the extension 13 and chamber 14, is given a rotary motion to effect a thorough mixing of the fluids before said fluids escape through the contracted outlet 15. The contraction of the outlet 15 serves to more or less retard the movement of the fluids passing through the chamber 14, which also makes for effective mixing of the fluids.

I claim:

1. A fluid mixing device comprising a body having extending from one side an elongated cylindrical extension with a contracted outlet at its end and forming a mixing chamber, said body being provided with steam and fluid inlets at right angles to one another and with an imperforated inclined partition between said inlets and dividing the body into two chambers, said partition extending downwardly from the upper part of the body opposite that from which the mixing chamber extends to the opposite side of the body and to within a short distance of the bottom of the same and forming with the adjacent wall of the body a transversely elongated passage opening into the mixing chamber through which the steam passes into said chamber.

2. A fluid mixing device, comprising a body having a steam inlet at one end, a water inlet in its top, and an elongated cylindrical mixing chamber projecting from the end of the body opposite that having the steam inlet, said chamber terminating in a contracted outlet, the body having an inclined partition dividing it into two chambers, the partition extending downwardly from the end of the body having the steam inlet, below the water inlet and in front of the steam inlet to the opposite end of the body and to within a short distance of the bottom of the same and forming with the adjacent wall of the body a transversely elongated steam passage opening into the mixing chamber.

3. A fluid mixing device comprising a body having at one end a cylindrical mixing chamber with a contracted outlet end, said body being provided with an imperforate inclined partition extending from end to end and dividing it into two chambers, each opening into the mixing chamber and with liquid and steam inlets, the liquid inlet being in one side of the body and opening into one chamber and the steam inlet being in the end of the body and opening into the other chamber, whereby the liquid and steam will be delivered into the mixing chamber and mixed therein and the liquid thereby heated.

ELVING OVID NELSON.